United States Patent

[11] 3,557,378

[72] Inventor Harvey W. Anger
Tonawanda, Buffalo, N.Y.

[21] Appl. No. 792,120
[22] Filed Jan. 17, 1969
[45] Patented Jan. 19, 1971
[73] Assignee E. I. du Pont de Nemours and Company
Wilmington, Del.
a corporation of Delaware

[54] RADIATION SENSITIVE MONITOR FOR METALIZED FILM
4 Claims, 5 Drawing Figs.

[52] U.S. Cl. .......... 250/219, 356/161
[51] Int. Cl. .......... G01b 11/02
[50] Field of Search .......... 250/219, 222, 221; 356/201—206, 161; 118/7, 8; 29/25.41

[56] References Cited
UNITED STATES PATENTS

| | | | |
|---|---|---|---|
| 3,185,024 | 5/1965 | McCreanor | 250/219 |
| 3,207,901 | 9/1965 | Barker | 250/219 |
| 3,400,687 | 9/1968 | Lueck | 250/219 |

OTHER REFERENCES

Gow et al., " Thin Film Gauging Device," IBM Technical Disclosure Bulletin Vol. 8 No. 11 4-1966

*Primary Examiner*—Walter Stolwein
*Attorney*—Donald W. Huntley

ABSTRACT: Apparatus for monitoring the coating thickness of a transparent substrate having metal coated on both sides so as to leave unregistered longitudinal unmetallized lanes, which apparatus comprises at least one light source and a photoreceptor juxtaposed to each light source, each light source directed substantially perpendicularly toward an unmetallized lane on the coated substrate.

INVENTOR
HARVEY W. ANGER

BY Donald W. Hewitt
ATTORNEY

INVENTOR
HARVEY W. ANGER

BY Donald W. Hunttey
ATTORNEY

RADIATION SENSITIVE MONITOR FOR METALIZED FILM

BACKGROUND OF THE INVENTION

In the preparation of polymeric film for use as capacitor film, metal is coated onto one or both sides of the film by various techniques to provide a film having the structural integrity and flexibility of oriented thermoplastic films in combination with at least one electrically conductive surface. Metal is deposited on one or both surfaces of the organic substrate by various techniques, including the vapor deposition of the metal on a continuous moving film.

For purposes of product control and detection of imperfections in the metal coating being deposited on the organic substrate, it is necessary that the thickness and uniformity of the metal coating on the polymeric film be monitored during the course of the metal deposition. Special problems resulting from the "flutter" of moving film at high speeds and the deposition of the metal vapor on optical testing equipment have complicated the monitoring operation.

Previously, it has been found most expedient to monitor the thickness of the metal coating by direct measurement of the electrical conductivity of the surface of the metallized film. This conductivity was measured by the contact of conductive rollers with the metallized surface and the measurement of the electrical current passed from one conductive roller through the metallized surface and through the second conductive roll. While this method provided a relatively reliable means for measuring the thickness of the metal coating deposited on the film, certain inherent deficiencies in the method make it undesirable for production of exceptionally thin, high quality, capacitor films. For example, the electrode rolls on the surface of a thin metal coating can cause scratching of the metal surface and the method as a whole becomes increasingly inaccurate with faster film speeds through electrical noise caused by film flutter at higher speeds. In addition, while this method provided a means for measuring the thickness of the metal layer, the detection of defects in a fully metallized sheet was difficult or impossible by this method.

SUMMARY OF THE INVENTION

The instant invention provides an apparatus for monitoring the thickness and continuity of metal coatings on exceptionally thin, fast moving film which avoids direct contact with the film. Specifically, the instant invention provides an improved monitoring apparatus for use in vacuum metallizing by vapor deposition of a metal on a continuous, moving, transparent, substrate, the monitoring apparatus comprising at least one source of substantially collimated light having a wavelength within the visible spectrum positioned on one side of the film and directed perpendicularly toward the film, a photoreceptor sensitive to the wavelength of the light source juxtaposed to each light source and on the opposite side of the film; and a utilization circuit means, e.g., for the measurement of the light transmission through the metallized film. Preferably, the wavelength of the light source is adjusted to fall within the range of about 4000 to 6000 angstroms.

DESCRIPTION OF THE PREFERRED EMBODIMENTS

Figure 1:
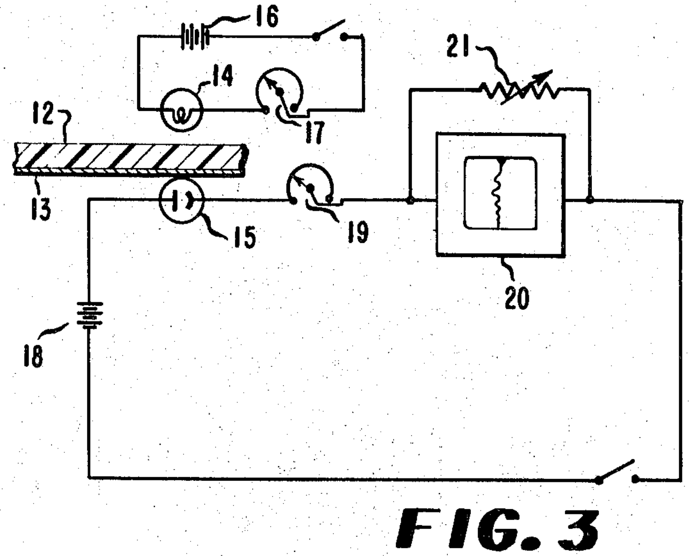
FIG. 1 is a schematic illustration of an electrical circuit diagram which can be used in the apparatus of the instant invention.

Light from sources used in the apparatus of the instant invention must be collimated so as to be directed in a substantially parallel beam. Collimation of the light source prevents angular reflection of the light by the metallized coating and thus increases the accuracy of the reading of light passed through the metallized coating. An additional reason for the collimation of the light source is found in the desirability of the use of a plurality of light sources to obtain more accurate measurements of the uniformity of the metallized coating, in which case collimation is necessary to prevent the reception of passed light from one light source by the photoreceptors positioned opposite adjacent light sources.

The collimation of the light source can be facilitated by any number of means known to those skilled in the art. For example, the light source can be channeled into a single beam by a lens mechanism to concentrate the beam to a particular desired diameter. It has also been found that for purposes of the instant invention the light source can be satisfactorily collimated simply by passage of the light source through a tube or shroud having a length of at least 1 inch and a diameter of less than one-half inch. One particularly satisfactory lens and bulb arrangement which can be used to provide collimated light in the instant invention is that commercially available from the Farmer Electric Products Company of Natick, Massachusetts, as Model LS–1C, using a General Electric No. 12 radio lamp.

It has been found that for the particular thickness of metallized coatings used in commercial capacitor films, wavelengths which can be used in the instant apparatus can fall within the entire range of the visible spectrum. The light source can therefore be any commonly available incandescent or fluorescent lamp. The particular wavelength used should be selected with regard to the particular organic substrate and metal coating so as to insure a wavelength having low absorbance by the substrate and high absorbance by the metal coatings. For many polymeric films, however, it has been found that wavelengths falling in the blue-green spectrum that is, within a range of 4000 to 6000 angstroms, are particularly well suited for the monitoring of capacitor films.

The photoreceptor used in the apparatus of the instant invention can be any receiver sensitive to the particular wavelength used in the optical source. Photoreceptors which have been found particularly suitable for the instant apparatus include those having sensitivity peaks at about 5100–5500 angstroms, such as those commercially available from the Clairex Company as Models 702–L and 5M–2L.

The utilization circuit can vary according to the particular form of recording or information indication desired, and serves to transform the reading of the photoreceptors into useable data. In one embodiment of the invention, the output of the receiver is coupled to a strip-chart recorder with a full scale deflection for an input of 10 millivolt.

As will be evident to those skilled in the art, the particular layout of the utilization circuit will vary according to the particular instrumentation used.

One basic electrical apparatus arrangement which can be used for monitoring thickness is schematically illustrated in FIG. 1. Film 12, with metal coating 13, is shown in enlarged cross section between light source 14 and receiver 15. The light source 14 is a low voltage, low wattage, incandescent lamp supplied by source 16 with rheostat 17. Receiver 15 is a "Clairex" 702–L photoconductor having a sensitivity peak at about 5150 angstroms, supplied by power supply 18. The output of receiver 15 is coupled through rheostat 19 to strip-chart recorder 20, which is shunted by variable resistor 21.

In operation, the setting of rheostat 17 is adjusted to lower resistance values for higher light intensities required to obtain sensitivity with thicker coatings which transmit less light. Rheostat 19 is adjusted for scale expansion and adjustments of recorder 20. Rheostat 21 is used to control chart readings for calibration purposes in conjunction with rheostat 17, as it used to control light intensity. In its preferred form, the output of the receiver is coupled to a strip-chart recorder such as a Brown recorder with a full scale deflection for an input of 10 millivolt.

The apparatus of the instant invention is applicable to capacitor films metallized on one or both sides. However, the method is limited in its application to those films having a total metal thickness of less than about $10\times10^{-6}$ centimeters, since light is generally not transmittable through greater thicknesses.

The particular film substrate used in the apparatus of the instant invention is not critical, and can be any film which does not absorb a substantial percentage of the light produced by the collimated light source. Such films include, for example, oriented films of polyethylene terephthalate, polycarbonate, polystyrene, and polypropylene.

The base film can be coated on one or both sides with a substantially continuous metal film. Often, however, films for capacitor use are metallized in lanes on two sides.

Figure 2:
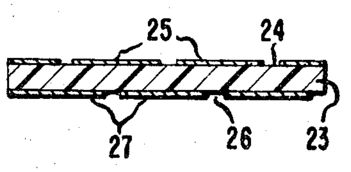
FIG. 2 is a cross-sectional illustration of a bilaterally metallized film which can be monitored by the apparatus of the instant invention.

A particular two-side metallized film for use in electrical capacitors is schematically shown in transverse cross section in FIG. 2. The metallized film 23 has a plurality of longitudinal metal-free lanes 24 on one surface separating the coating into a plurality of metal bands 25. On the other surface, metal-free lanes 26 similarly divide the surface into a plurality of longitudinal metallized bands 27. The metal-free lanes on one surface are out of register with the metal-free lanes on the opposite surface, so that capacitor strips can be made by slitting along the center of the metal-free lane on each surface which locates the slit near the center of the metallized band on the other side. The resulting strip thus has metal coating on each surface, each surface having the metal extend fully to one edge of the strip, for electrical coupling to terminal leads, and a metal-free margin on the other edge, the metal-free margin on each surface being at opposite edges of the strip. The widths of the metal-free lanes before slitting are generally about from one-eighth to one-fourth inch. The thickness of the coating on each surface can be monitored with the apparatus of the instant invention by utilization of the metal-free lanes for determination of the apparent optical density of the coating on each surface. A narrow, collimated beam of light is directed at the metal-free lanes on each surface to accurately measure each metal coating.

Figure 3:
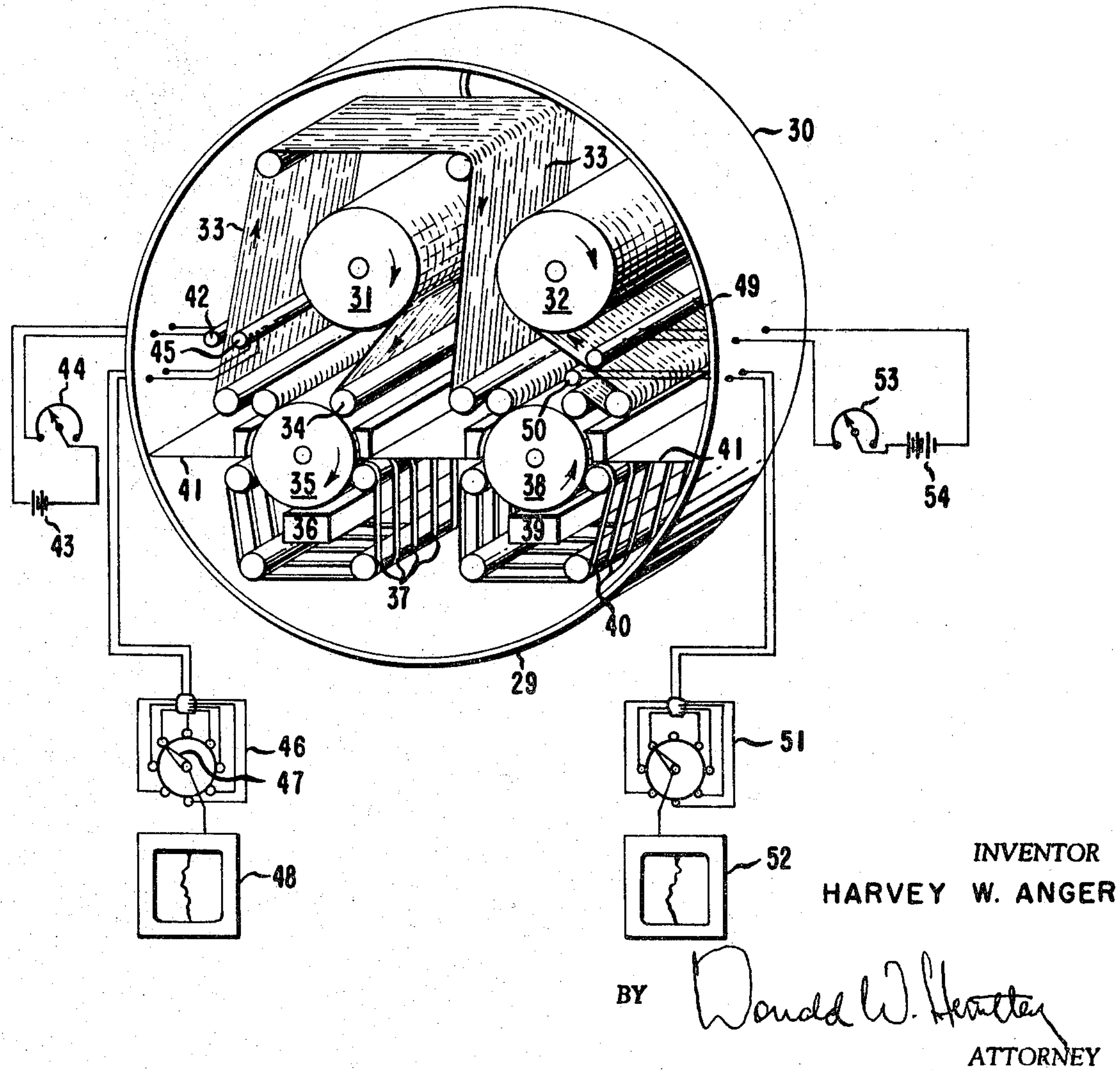
FIG. 3 illustrates an apparatus for preparing the metallized films of FIG. 2 incorporating the monitoring apparatus of the instant invention.

The instant invention can be readily incorporated into metallizing apparatus conventionally used in the art, and as shown, for example, in FIG. 3, which schematically illustrates apparatus for metallizing multiband two-side film, such as illustrated in FIG. 2. This apparatus operates in a vacuum environment in an enclosure provided by removable shell 29, shown in dotted outline, which, in operation, is in hermetic contact with rigid wall 30. The latter also serves to support operating elements of the metallizer. Film to be coated moves in the coating process from supply roll 31, through the metallizing process to windup roll 32, where it is wound as multilane, two-side metallized film. Film 33 in the process passes over isolation rolls 34 to partially wrap metallizing drum 35, which is rotated by an external source of torque and is internally cooled.

Positioned below metallizing roll 35 is source 36 which is heated to vaporize a metal for deposition on the film. Interposed between source 36 and film 33 on drum 35 are spaced apart, continuous band masks 37 which pass over rollers are spaced across and are in contact with film 33 while the film is on drum 35; the masks prevent deposition of metal and divide the coating into separate metallized bands with intervening metal-free lanes. After deposition of the multilane coating on one side of film 33, it passes over a series of rolls to metallizing roll 38, which exposes the other side of the film to source 39, with interposed, continuous band masks 40, as described for the step of metallizing the first side. The metallizer, as shown, preferably has baffle 41 which prevents deposition of metal, from stray vapor, on elements in the upper part of the chamber, where the thickness measuring elements of the present invention preferably are located.

The thickness measuring elements, as shown, monitor the thickness on the first side coated before deposition of the coating on the other side of the film. The thickness of the coating can be also determined simultaneously by measurement on each side through vacant lanes on the respective sides of the two-side metallized film. FIG. 3 shows the thickness-sensing apparatus as light sources 42 supplied with power from the exterior of the enclosure by a power circuit, shown schematically, comprising power supply 43, with rheostat 44 for adjustment of the light intensity. Light source 42 comprises a plurality of separate incandescent lamps corresponding to the number of bands being metallized, each with a lens arrangement, not shown, to collimate the light and minimize stray light. Each lamp is positioned in monitoring the first side coating so as to be near the center of the metallized band. Receiver 45 is positioned opposite the source so that passage of the metallized film between source 42 and receiver 45 intercepts light between the source and receiver 45, which has a plurality of photocells corresponding to the number of lamps. The output of each photocell is fed from the enclosure to multiple-pole rotary switch 46 on the exterior of the enclosure. Rotary switch 46 can be manually operated, or it can be repeatedly cycled by electrical or pneumatic means to sample the coating in each lane periodically, Rotary wiper 47 of switch 46 is coupled to strip-chart recorder 48 wherein the output indicative of the thickness is displayed visually.

The coating monitor apparatus for the second side, shown as elements 49—54, is substantially identical to that shown for monitoring the coating on the first side. Greater care must be used to assure that the light beam is sufficiently narrow and properly positioned to pass through the metal-free lanes on the side first coated and monitor the coating on the second side.

Figure 4:
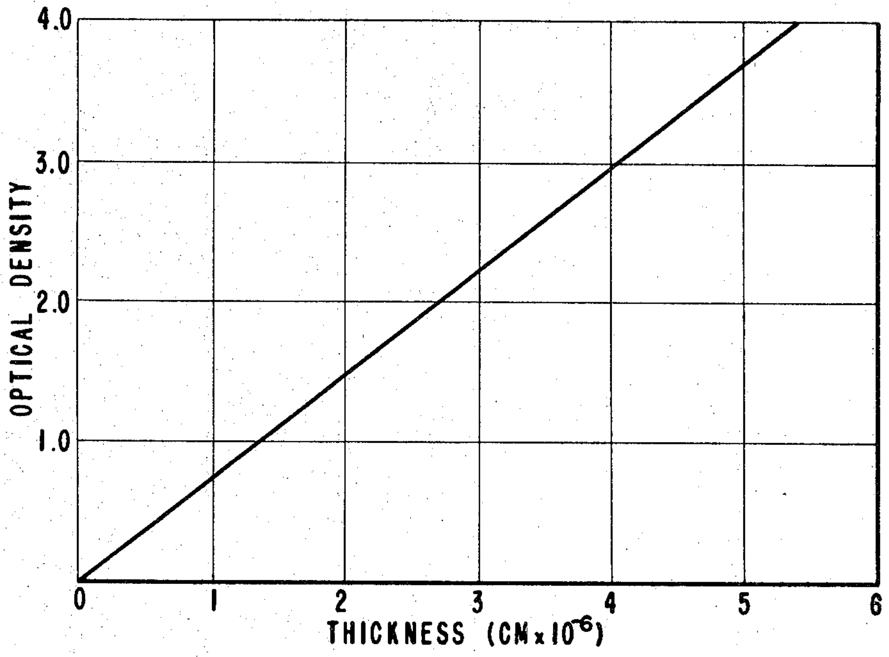
FIGS. 4 and 5 are graphical illustrations of the relationship between the optical density and the thickness and resistance of an aluminum metal coating.
Figure 5:
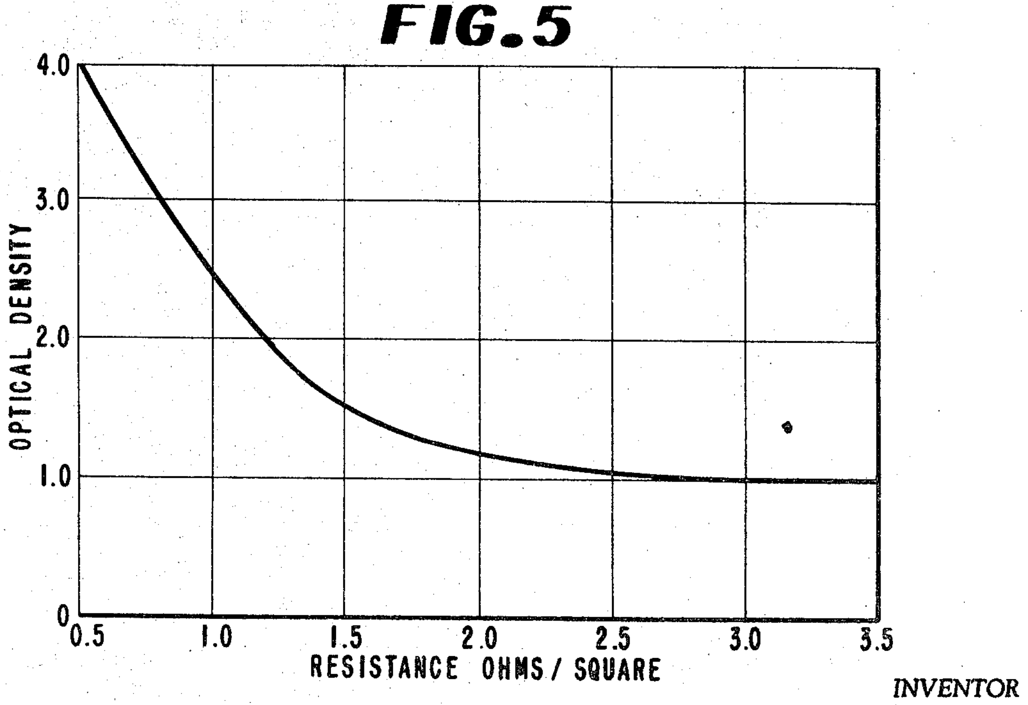

The variation of the optical density with the conductivity and thickness of the metal coating will vary with the particular metal deposited on the substrate. FIGS. 4 and 5 graphically illustrate the relationship of these variables for aluminum metal. The coating thickness can be determined by a wet chemical method as described in 55 J. Amer. Chem. Soc. 2437 (1933). The apparent optical density, measured by a spectrophotometer, is given as the percentage of incident light reflected and absorbed by the metal coating.

I claim:

1. An improved monitoring apparatus for use in vacuum metallizing by vapor deposition of a metal on two sides of a continuous, moving, transparent, substrate so as to leave a plurality of longitudinal, unmetallized lanes on the surfaces of the substrate, each unmetallized lane being opposite a metallized portion of the second surface of the substrate, the monitoring apparatus comprising at least one source of substantially collimated light having a wavelength within the visible spectrum positioned on one side of and directed substantially perpendicularly toward an unmetallized lane on the substrate, a photoreceptor sensitive to the wavelength of the light source juxtaposed to each light source and positioned on the opposite side of the substrate to receive light from the source, and a utilization circuit means functionally associated with the photoreceptor.

2. An apparatus of claim 1 wherein the light source has a wavelength of about from 4000 to 6000 angstroms.

3. An apparatus of claim 1 wherein the receptor has a sensitivity peak of about 5,150 angstroms.

4. An apparatus of claim 1 wherein the utilization circuit means comprises a strip recorder.